United States Patent
Smith

(10) Patent No.: US 10,288,040 B2
(45) Date of Patent: May 14, 2019

(54) CURRENT LIMIT CALCULATION FOR WIND TURBINE CONTROL

(71) Applicant: General Electric Company, Schenectady, NY (US)

(72) Inventor: David Smith, Daleville, VA (US)

(73) Assignee: General Electric Company, Schenectady, NY (US)

(*) Notice: Subject to any disclaimer, the term of this patent is extended or adjusted under 35 U.S.C. 154(b) by 659 days.

(21) Appl. No.: 14/851,010

(22) Filed: Sep. 11, 2015

(65) Prior Publication Data

US 2017/0074247 A1 Mar. 16, 2017

(51) Int. Cl.
| | | |
|---|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| F03D 7/04 | (2006.01) |
| H02J 3/38 | (2006.01) |

(52) U.S. Cl.
CPC .............. *F03D 7/042* (2013.01); *H02J 3/386* (2013.01)

(58) Field of Classification Search
CPC ...... F03D 7/042; F03D 7/0224; F03D 7/0284; F03D 7/0296; F03D 7/043; F03D 9/25; H02J 3/386; F05B 2270/10711; F05B 2270/309; F05B 2270/337; H02M 2007/4822; H02M 7/04; H02M 7/44; H02M 7/493; H02M 7/77; H02M 7/81; H02P 21/50; H02P 9/00; H02P 9/04; Y02E 10/723; Y02E 10/76

USPC ......................................................... 700/287
See application file for complete search history.

(56) References Cited

U.S. PATENT DOCUMENTS

| | | | |
|---|---|---|---|
| 9,503,007 B2 * | 11/2016 | Wagoner ................. | H02P 9/007 |
| 2006/0012327 A1 * | 1/2006 | Iwashita ............. | H02P 21/0089 |
| | | | 318/717 |
| 2007/0024059 A1 * | 2/2007 | D'Atre et al. ........ | F03D 7/0272 |
| | | | 290/44 |

(Continued)

OTHER PUBLICATIONS

Excell Software Manual, 2013, pages.*

*Primary Examiner* — Thomas C Lee
*Assistant Examiner* — Zhipeng Wang
(74) *Attorney, Agent, or Firm* — Dority & Manning, PA

(57) ABSTRACT

Systems and methods for determining current limits used in controlling wind turbine systems are provided. An example wind turbine controller identifies a largest current magnitude out of a first current magnitude, a second current magnitude, and a third current magnitude of a three phase power bus. The turbine controller averages the first current magnitude, the second current magnitude, and the third current magnitude to obtain an average current magnitude. The turbine controller determines a maximum current adjustment factor based at least in part on the largest current magnitude and based at least in part on the average current magnitude. The turbine controller adjusts a maximum current magnitude limit of the wind turbine by the maximum current adjustment factor to obtain an adjusted maximum current magnitude limit. The turbine controller controls the wind turbine based at least in part on the adjusted maximum current magnitude limit.

14 Claims, 6 Drawing Sheets

(56) References Cited

U.S. PATENT DOCUMENTS

| | | | |
|---|---|---|---|
| 2013/0107586 A1* | 5/2013 | Klodowski | H02P 9/00 363/34 |
| 2014/0097619 A1* | 4/2014 | Laborda Rubio | F03D 7/0224 290/44 |
| 2014/0204643 A1* | 7/2014 | Wagoner | H02M 7/5387 363/132 |
| 2015/0365033 A1* | 12/2015 | Salmon | H02P 27/02 322/47 |
| 2016/0043651 A1* | 2/2016 | Fulcher | H02M 7/04 290/44 |
| 2017/0018931 A1* | 1/2017 | Kahn | H02J 3/385 |

* cited by examiner

CURRENT LIMIT CALCULATION FOR WIND TURBINE CONTROL

FIELD OF THE INVENTION

The present subject matter relates generally to power systems, and more particularly to systems and methods for determining current limits used in controlling power systems, such as wind turbine systems.

BACKGROUND OF THE INVENTION

A wind turbine can include a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency (e.g., 50 Hz, 60 Hz, etc.). Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Wind turbines have a plurality of electrical and mechanical components. Each component may have independent or different operating limitations, such as current, voltage, power, and/or temperature limits, than other components. The wind turbine system may also have its own operating limits. The operating limits may be designed or selected to allow the wind turbine to operate at a peak efficiency, output power with desired parameters, and/or to prevent conditions from occurring at the wind turbine which may damage wind turbine components.

As one example, a maximum current limit can be set for the wind turbine. The wind turbine control system can maintain a current of the wind turbine at or below the maximum current limit to protect against overcurrent situations in the generator, the converter, or other turbine system components. The current of the wind turbine can have a real current component and a reactive current component, where real current is the component of current in phase with voltage and reactive current is the component ninety degrees out of phase with voltage.

As another example, a maximum reactive current limit can be set for the wind turbine. The maximum reactive current limit can be a function of the maximum current limit and one or more feedback signals indicative of the real current occurring at the wind turbine. For example, a limiting function can be applied to the maximum current limit and the feedback signals indicative of the real current to determine the maximum reactive current limit. Thus, as the real current fluctuates during operation of the wind turbine, the maximum reactive current limit can be recalculated. The wind turbine control system can maintain a reactive current setpoint at or below the maximum reactive current limit so that the current is maintained at or below the maximum current limit.

Certain existing schemes for calculating the maximum reactive current limit fail to account for imbalances among the three phases of power occurring at the grid to which the wind turbine is coupled. Such imbalances can include, for example, an imbalance in the voltage and/or current among the three phases of grid power. The control system's failure to account for imbalances in the three phases of grid power can result in excessively large current (e.g., in the turbine converter and/or generator). In particular, although the average current magnitude is held to the desired limit value, an individual phase could have excessively high current.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method for controlling a power system. The method includes obtaining, by one or more control devices, data indicative of a current imbalance of a multi-phase output of the power system. The method includes determining, by the one or more control devices, a maximum current adjustment factor based at least in part on the data indicative of the current imbalance of the multi-phase output. The method includes adjusting, by the one or more control devices, a maximum current magnitude limit of the power system by the maximum current adjustment factor to obtain an adjusted maximum current magnitude limit. The method includes controlling, by the one or more control devices, the power system based at least in part on the adjusted maximum current magnitude limit.

Another example aspect of the present disclosure is directed to a control system for a power system. The control system includes a selector that identifies a largest current magnitude out of a first current magnitude of a first phase of power, a second current magnitude of a second phase of power, and a third current magnitude of a third phase of power. The control system includes an average calculator that averages the first current magnitude, the second current magnitude, and the third current magnitude to obtain an average current magnitude. The control system includes a first summation node that subtracts the average current magnitude from the largest current magnitude to obtain a maximum current adjustment factor. The control system includes a second summation block that subtracts the maximum current adjustment factor from a maximum current magnitude limit of the power system to obtain an adjusted maximum current magnitude limit. The control system includes one or more control devices that control the power system based at least in part on the adjusted maximum current magnitude limit.

Yet another example aspect of the present disclosure is directed to a wind turbine system. The wind turbine system includes a generator. The wind turbine system includes a rotor configured to rotatably drive the generator. The wind turbine system includes a turbine controller. The turbine controller obtains data indicative of a first current magnitude of a first phase of power, a second current magnitude of a second phase of power, and a third current magnitude of a third phase of power. The turbine controller identifies a largest current magnitude out of the first current magnitude, the second current magnitude, and the third current magnitude. The turbine controller averages the first current magnitude, the second current magnitude, and the third current magnitude to obtain an average current magnitude. The turbine controller determines a maximum current adjustment factor based at least in part on the largest current magnitude and based at least in part on the average current magnitude. The turbine controller adjusts a maximum current magnitude limit of the wind turbine by the maximum current adjustment factor to obtain an adjusted maximum current magnitude limit. The turbine controller controls the wind turbine based at least in part on the adjusted maximum current magnitude limit.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
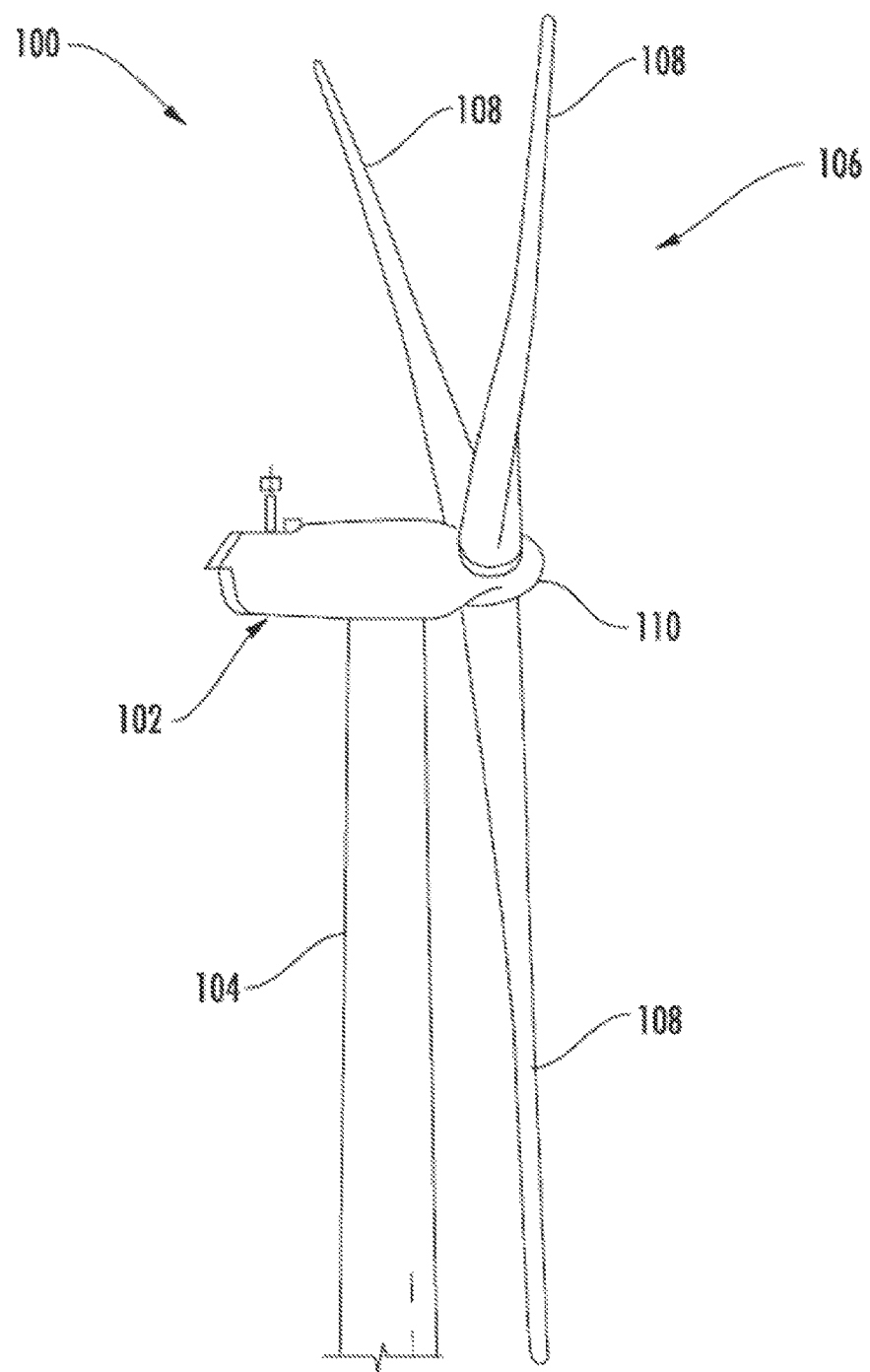
FIG. 1 depicts a portion of an example wind turbine according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for determining current limits used in controlling power systems, such as wind turbine systems. In particular, example aspects of the present disclosure are directed to systems and methods for calculating an adjusted maximum current magnitude limit and a maximum reactive current magnitude limit in a fashion which accounts for imbalances in the three phase power of the grid to which the power system is electrically coupled.

More particularly, without the improvements provided by the present disclosure, an unbalanced grid voltage can result in unbalanced and/or excessively large currents within at least one phase the power system (e.g., in the converter and/or generator of a wind turbine). The overloaded phase current can result in either an overcurrent protector tripping or performance of an unnecessarily large amount of power-limiting of the power system.

To resolve such problems, example aspects of the present disclosure are directed to control system designs which detect and evaluate an imbalance in the three phase grid power and adjust various current limits accordingly. As one example, the control system can subtract a scaled difference between a maximum current and an average current of the three phases of grid power from a maximum current magnitude limit to obtain an adjusted maximum current magnitude limit which counteracts or otherwise accounts for any imbalances among the three phases of power occurring at the grid.

The adjusted maximum current magnitude limit can be used in place of the original maximum current magnitude limit for any control techniques or processes. As one example, the adjusted maximum current magnitude limit can be used in place of the original maximum current magnitude limit as an input to a reactive current limit calculation scheme which determines a maximum reactive current magnitude limit based on the input current magnitude limit and fluctuations in real current occurring at the power system. Thus, the resulting maximum reactive current magnitude limit results in limitation of the current magnitude which accounts for both fluctuations in the real current magnitude and imbalances in the grid phases.

In this way, a technical effect of example embodiments of the present disclosure can include calculating an adjusted maximum current magnitude limit and a maximum reactive current magnitude limit in a fashion which accounts for imbalances in the three phase power of the grid to which the power system is electrically coupled. Example schemes, systems, methods, and circuitry to accomplish this technical effect will be discussed further below with reference to the Figures. Further, although the example aspects of the present disclosure are discussed with particular reference to a wind turbine, the present disclosure is equally applicable to other power systems, such as power generation systems or power storage systems.

Example aspects of the present disclosure are discussed with reference to a wind turbine system for purposes of illustration and discussion. Those of ordinary skill in the art, using the disclosures provided herein, will understand that various aspects of any of the embodiments disclosed herein can be used with other power systems, such as solar power systems, gas turbine systems, energy storage systems, and other power systems.

FIG. 1 is a perspective view of a portion of an example wind turbine 100. Wind turbine 100 can include a nacelle 102 housing a generator (not shown in FIG. 1). Nacelle 102 can be mounted on a tower 104 (a portion of tower 104 being shown in FIG. 1). Tower 104 may have any suitable height/ altitude (e.g., 75 m, 120 m, etc.) that facilitates operation of wind turbine 100 as described herein. Wind turbine 100 can also include a rotor 106 that includes three blades 108 attached to a rotating hub 110. Wind turbine 100 can include any number of blades 108 that facilitates operation of wind turbine 100 as described herein. In example embodiments, wind turbine 100 can include a gearbox operatively coupled to rotor 106 and a generator.

Figure 2:
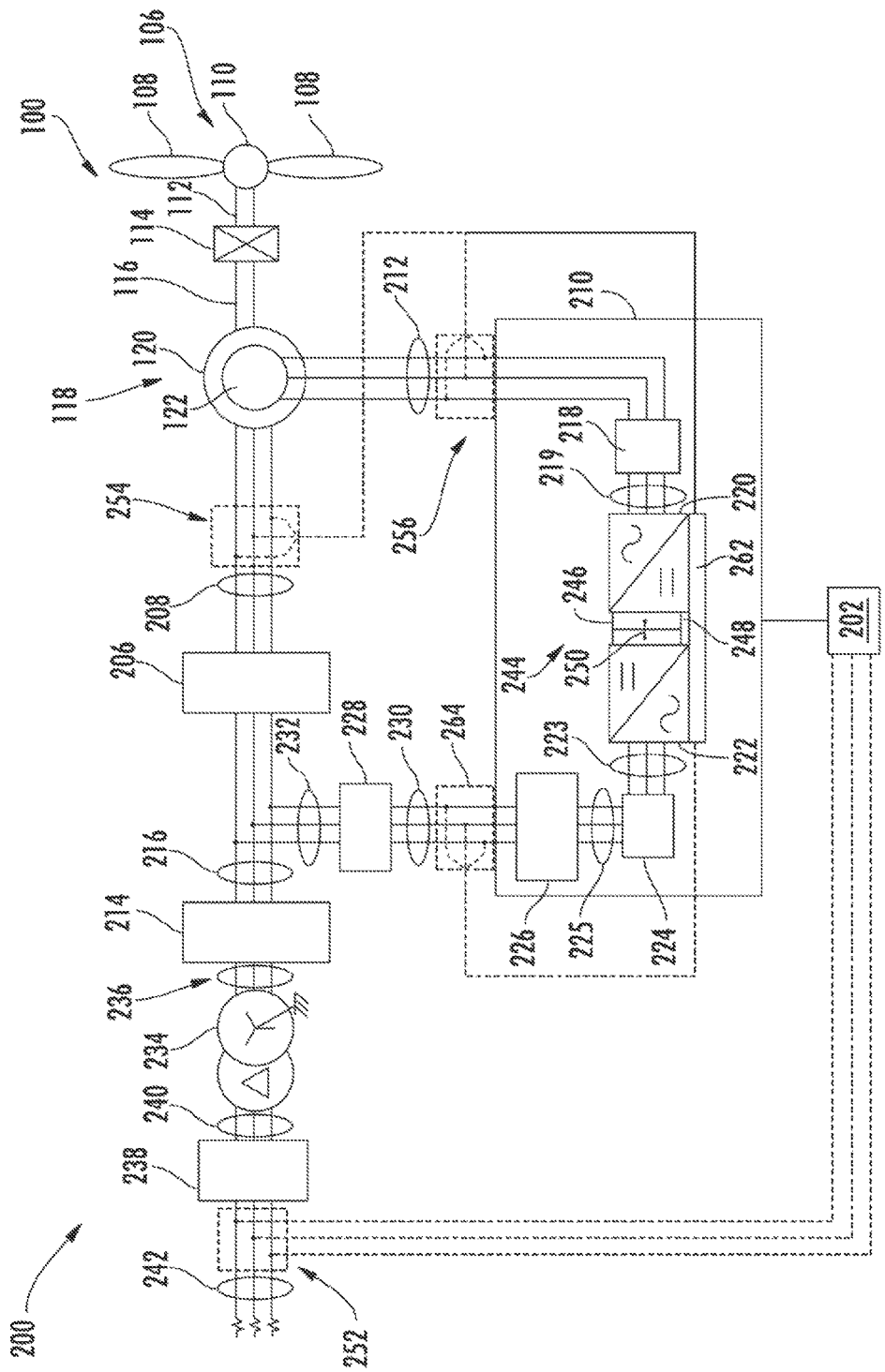
FIG. 2 depicts an example electrical and control system of an example wind turbine according to example embodiments of the present disclosure.

FIG. 2 is a schematic view of an example electrical and control system 200 that may be used with wind turbine 100. Rotor 106 can include blades 108 coupled to hub 110. Rotor 106 can also include a low-speed shaft 112 rotatably coupled to hub 110. Low-speed shaft 112 can be coupled to a step-up gearbox 114 that can be configured to step up the rotational speed of low-speed shaft 112 and transfer that speed to a high-speed shaft 116. In one example embodiment, gearbox 114 can have a step-up ratio of approximately 70:1. For example, low-speed shaft 112 rotating at approximately 20 revolutions per minute (rpm) coupled to gearbox 114 with an approximately 70:1 step-up ratio can generate a speed for high-speed shaft 116 of approximately 1400 rpm. As used herein, the use of the term "about" or "approximately" in conjunction with a stated numerical value refers to within 25% of the stated numerical value. Gearbox 114 can have any suitable step-up ratio that facilitates operation of wind turbine 100 as described herein. In one embodiment, wind turbine 100 can include a direct-drive generator that is rotatably coupled to rotor 106 without any intervening gearbox.

High-speed shaft 116 can be rotatably coupled to generator 118. In one example embodiment, generator 118 can be a wound rotor, three-phase, double-fed induction (asynchronous) generator (DFIG) that includes a generator stator 120 magnetically coupled to a generator rotor 122. In one embodiment, generator rotor 122 can include a plurality of permanent magnets in place of rotor windings.

Electrical and control system 200 can include a turbine controller 202. Turbine controller 202 can include one or more processors and one or more memory devices. The turbine controller 202 can further include, at least one processor input channel and at least one processor output channel. In example embodiments, the turbine controller 202 can include one or more computing devices.

As used herein, the term computing device is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein. In one example embodiment, a memory device can include, but is not limited to, a computer-readable medium, such as a random access memory (RAM). In one embodiment, one or more storage devices, such as a floppy disk, a compact disc read only memory (CD-ROM), a magneto-optical disk (MOD), and/or a digital versatile disc (DVD) can be used. Also, in one example embodiment, additional input channels can be, but are not limited to, computer peripherals associated with an operator interface such as a mouse and a keyboard. Further, in one embodiment, additional output channels may include, but are not limited to, an operator interface monitor.

One or more processors for turbine controller 202 can process information transmitted from a plurality of electrical and electronic devices that may include, but are not limited to, voltage and current transducers. RAM, ROM, and/or storage devices can store and transfer information and instructions to be executed by the one or more processors. RAM, ROM and/or storage devices can also be used to store and provide temporary variables, static (i.e., non-changing) information and instructions, or other intermediate information to the one or more processors during execution of instructions by the one or more processors. Instructions that are executed include, but are not limited to, resident conversion and/or algorithms. The execution of sequences of instructions is not limited to any specific combination of hardware circuitry and software instructions.

Referring still to FIG. 2, generator stator 120 can be electrically coupled to a stator synchronizing switch 206 via a stator bus 208. In an example embodiment, to facilitate the DFIG configuration, generator rotor 122 can be electrically coupled to a bi-directional power conversion assembly 210 via a rotor bus 212. In one embodiment, generator rotor 122 can be electrically coupled to rotor bus 212 via any other device that facilitates operation of electrical and control system 200 as described herein. In one embodiment, electrical and control system 200 can be configured as a full power conversion system that includes a full power conversion assembly similar in design and operation to power conversion assembly 210 and electrically coupled to generator stator 120. The full power conversion assembly can facilitate channeling electric power between generator stator 120 and an electric power transmission and distribution grid. In one example embodiment, stator bus 208 can transmit three-phase power from generator stator 120 to stator synchronizing switch 206. Rotor bus 212 can transmit three-phase power from generator rotor 122 to power conversion assembly 210. In one embodiment, stator synchronizing switch 206 can be electrically coupled to a main transformer circuit breaker 214 via a system bus 216. In one embodiment, one or more fuses (not shown) are used instead of main transformer circuit breaker 214. In another embodiment, neither fuses nor main transformer circuit breaker 214 is used.

Power conversion assembly 210 can include a rotor filter 218 that is electrically coupled to generator rotor 122 via rotor bus 212. A rotor filter bus 219 can electrically couple rotor filter 218 to a rotor-side power converter 220, and rotor-side power converter 220 can be electrically coupled to a line-side power converter 222. Rotor-side power converter 220 and line-side power converter 222 can be power converter bridges including power semiconductors. In one embodiment, rotor-side power converter 220 and line-side power converter 222 can be configured in a three-phase, pulse width modulation (PWM) configuration including insulated gate bipolar transistor (IGBT) switching devices. In one embodiment, rotor-side power converter 220 and line-side power converter 222 can have any configuration using any switching devices that facilitate operation of electrical and control system 200 as described herein. Power conversion assembly 210 can be coupled in electronic data communication with turbine controller 202 to control the operation of rotor-side power converter 220 and line-side power converter 222.

In one embodiment, a line-side power converter bus 223 can electrically couple line-side power converter 222 to a line filter 224. A line bus 225 can electrically couple line filter 224 to a line contactor 226. Moreover, line contactor 226 can be electrically coupled to a conversion circuit breaker 228 via a conversion circuit breaker bus 230. In addition, conversion circuit breaker 228 can be electrically coupled to main transformer circuit breaker 214 via system bus 216 and a connection bus 232. In one embodiment, line filter 224 can be electrically coupled to system bus 216 directly via connection bus 232 and can include any suitable protection scheme configured to account for removal of line contactor 226 and conversion circuit breaker 228 from electrical and control system 200. Main transformer circuit breaker 214 can be electrically coupled to an electric power main transformer 234 via a generator-side bus 236. Main transformer 234 can be electrically coupled to a grid circuit breaker 238 via a breaker-side bus 240. Grid circuit breaker 238 can be connected to the electric power transmission and distribution grid via a grid bus 242. In one embodiment, main transformer 234 can be electrically coupled to one or more fuses, rather than to grid circuit breaker 238, via breaker-side bus 240. In one embodiment, neither fuses nor grid circuit breaker 238 is used, but rather main transformer 234 is coupled to the electric power transmission and distribution grid via breaker-side bus 240 and grid bus 242.

In one embodiment, rotor-side power converter 220 can be coupled in electrical communication with line-side power converter 222 via a single direct current (DC) link 244. In one embodiment, rotor-side power converter 220 and line-side power converter 222 can be electrically coupled via individual and separate DC links. DC link 244 can include a positive rail 246, a negative rail 248, and at least one capacitor 250 coupled between positive rail 246 and negative rail 248. In one embodiment, capacitor 250 can include one or more capacitors configured in series and/or in parallel between positive rail 246 and negative rail 248.

Turbine controller 202 can be configured to receive a plurality of voltage and electric current measurement signals from a first set of voltage and electric current sensors 252. Moreover, turbine controller 202 can be configured to monitor and control at least some of the operational variables associated with wind turbine 100. In one embodiment, each of three voltage and electric current sensors 252 are electrically coupled to each one of the three phases of grid bus 242. Alternatively, voltage and electric current sensors 252 are electrically coupled to system bus 216. In one embodiment, voltage and electric current sensors 252 can be electrically coupled to any portion of electrical and control system 200 that facilitates operation of electrical and control system 200 as described herein. In one embodiment, turbine controller 202 can be configured to receive any number of voltage and electric current measurement signals from any number of voltage and electric current sensors 252 including, but not limited to, one voltage and electric current measurement signal from one transducer.

In one embodiment, electrical and control system 200 can also include a converter controller 262 that is configured to receive a plurality of voltage and electric current measurement signals. For example, in one embodiment, converter controller 262 can receive voltage and electric current measurement signals from a second set of voltage and electric current sensors 254 coupled in electronic data communication with stator bus 208. Converter controller 262 can receive a third set of voltage and electric current measurement signals from a third set of voltage and electric current sensors 256 coupled in electronic data communication with rotor bus 212. Converter controller 262 can also receive a fourth set of voltage and electric current measurement signals from a fourth set of voltage and electric current sensors 264 coupled in electronic data communication with conversion circuit breaker bus 230. Second set of voltage and electric current sensors 254 can be substantially similar to first set of voltage and electric current sensors 252, and fourth set of voltage and electric current sensors 264 can be substantially similar to third set of voltage and electric current sensors 256.

Converter controller 262 can be substantially similar to turbine controller 202 and can be coupled in electronic data communication with turbine controller 202. Moreover, in one embodiment, converter controller 262 can be physically integrated within power conversion assembly 210. In one embodiment, converter controller 262 can have any configuration that facilitates operation of electrical and control system 200 as described herein.

In some embodiments, converter controller 262 can control power conversion assembly 210 to provide various functions such power factor control (e.g., outputting a desired amount and/or ratio of reactive power and real power), AC voltage and frequency control, etc. Power conversion assembly 210 can generate reactive power by providing a reactive current component.

During operation of example embodiments, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In one embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 can be configured to close to facilitate connecting the three-phase power from generator stator 120 with the three-phase power from power conversion assembly 210.

Conversion circuit breaker 228, main transformer circuit breaker 214, and grid circuit breaker 238 can be configured to disconnect corresponding buses, for example, when excessive current flow may damage the components of electrical and control system 200. Additional protection components can also be provided including line contactor 226, which may be controlled to form a disconnect by opening a switch corresponding to each line of line bus 225.

Power conversion assembly 210 can compensate or adjust the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, can facilitate feeding back at least some of the generated electrical power into generator rotor 122. More specifically, electrical power can transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion can be monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 can be configured to receive control signals from turbine controller 202. The control signals are based on sensed conditions or operating characteristics of wind turbine 100 and electrical and control system 200. The control signals can be received by turbine controller 202 and can be used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner.

According to example aspects of the present disclosure, the turbine controller 202 can control an operating condition of the wind turbine 100 based on operating limits determined for various electrical and/or mechanical components (e.g., cables, transformers, switches, breakers, buses, connectors, etc.) of the wind turbine 100. For instance, one or more of the converter controller 262 and the turbine controller 202 can determine an operating limit for the wind turbine 100 based on operating limits determined for each of one or more components of the wind turbine. In one embodiment, the converter controller 262 can determine the operating limit for the wind turbine 100 and communicate the operating limit to the turbine controller 202. The turbine controller 202 can adjust an operating condition of the wind turbine to stay within the operating limit for the wind turbine. For instance, the turbine controller 202 can be configured to perform one or more of adjusting a power output of the generator 118 of the wind turbine 100, adjusting a torque of the generator 118 of the wind turbine 100, or adjusting a rotational speed of the rotor 106 of the wind turbine 100 to stay within the operating limit (e.g., a speed limit or power limit) for the wind turbine 100.

As one example, a maximum current limit can be set for the wind turbine 100. The turbine controller 202 and/or converter controller 262 can maintain a magnitude of a current of the wind turbine 100 at or below the maximum current limit to protect against overcurrent situations in the generator 118, a converter (e.g., rotor-side power converter 220 and/or line-side power converter 222), or other turbine system components. The current can include a real current component and a reactive current component.

As another example, a maximum reactive current limit can be set for the wind turbine 100. The maximum reactive current limit can be a function of the maximum current limit and one or more feedback signals indicative of the real current occurring at the wind turbine. For example, a limiting function can be applied to the maximum current limit and the feedback signals indicative of the real current to determine the maximum reactive current limit. Thus, as the real current fluctuates, the maximum reactive current limit can be recalculated. The turbine controller 202 and/or converter controller 262 can maintain the reactive current component at or below the maximum reactive current limit so that the current is maintained at or below the maximum current limit.

Figure 3:
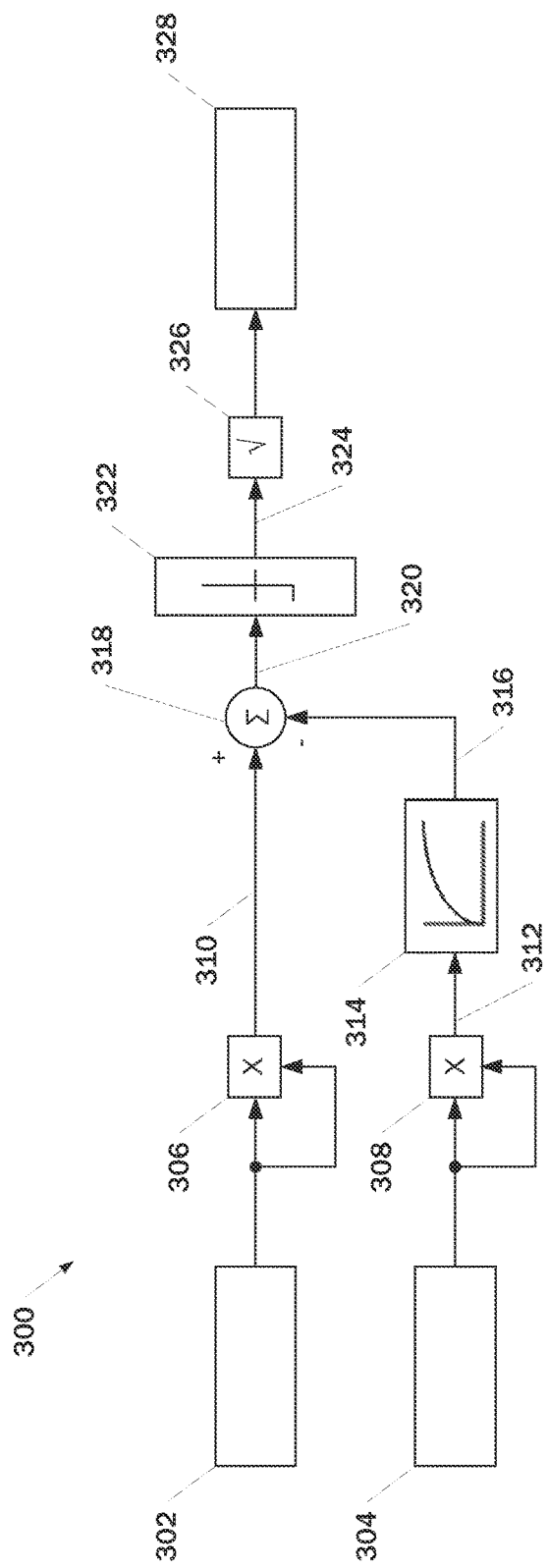
FIG. 3 depicts an example reactive current limit calculation scheme.

FIG. 3 depicts an example reactive current limit calculation scheme 300 that can be implemented by one or more control devices (e.g., one or more of turbine controller 202, converter controller 262, etc.). The scheme 300 can determine a maximum reactive current limit for a wind turbine. In some embodiments, the reactive current limit calculation scheme 300 can be denominated as a reactive current limit calculator. In some embodiments, the reactive current limit calculation scheme 300 can be denominated as implementing a limiting function.

The reactive current limit calculation scheme 300 receives as inputs a maximum current magnitude limit 302 and one or more signals indicative of the magnitude of real current 304. In some embodiments, the maximum current magnitude limit 302 is a predetermined value that is stored in and retrieved from memory. For example, the maximum current magnitude limit 302 can be designed or selected to prevent conditions from occurring at the wind turbine which may damage wind turbine components (e.g., overcurrent situations in the generator, the converter, or other turbine system components). Thus, in some embodiments, the maximum current magnitude limit 302 is determined based on the operative capabilities and capacities of various turbine components.

In one embodiment, the one or more signals indicative of the magnitude of the real current 304 can be indications of real current occurring at the rotor bus 212 (e.g., signals received from the third set of voltage and electric current sensors 256). In other embodiments, the one or more signals indicative of the magnitude of the real current 304 can be indications of real current occurring at the grid bus 242, system bus 216, the stator bus 208, the conversion circuit breaker bus 230, or other component of the power system.

Furthermore, in some embodiments, the one or more signals indicative of the magnitude of the real current 304 can be determined based on one or more of three current measurements respectively describing current at three phases of one the various buses discussed above and the real component of each current can be determined from such current measurements. Other schemes for determining the magnitude of the real current 304 may be used alternatively or in addition to the above discussed technique.

The reactive current limit calculation scheme 300 includes a multiplication node 306 that multiplies the maximum current magnitude limit 302 by itself to obtain a squared maximum current magnitude limit 310. The scheme 300 further includes a multiplication node 308 that multiples the real current magnitude 304 by itself to obtain a squared real current magnitude 312.

In some embodiments, the scheme 300 includes a filter 314 that filters the squared real current magnitude 312 to obtain a filtered squared real current magnitude 316. The filter 314 can be a low pass filter, a band pass filter, or other forms of filters. The filter 314 can be an analog filter or a digital filter. The filter 314 can be designed to filter signal components that have frequencies other than the frequency of the real current signal (e.g., 50 Hz, 60 Hz, etc.). In other embodiments, the scheme 300 does not include the filter 314.

The scheme 300 includes a summation node 318 that subtracts the filtered squared real current magnitude 316 from the squared maximum current magnitude limit 310 to obtain a raw squared maximum reactive current limit 320.

The scheme 300 includes a clamper 322 that clamps the raw squared maximum reactive current limit 320 to obtain a squared maximum reactive current limit 324. In particular, the clamper 322 can ensure that the squared maximum reactive current limit 324 is not negative. Thus, as one example, the clamper 322 can pass through any values of the raw squared maximum reactive current limit 320 which are greater than zero while setting equal to zero any values of the raw squared maximum reactive current limit 320 which are less than zero. As another example, the clamper 322 can shift the raw squared maximum reactive current limit 320 by an offset value to ensure that all parts of the squared maximum reactive current limit 324 are greater than zero.

The scheme 300 includes a square root node 326 that determines a square root of the squared maximum reactive current limit 324 to obtain a maximum reactive current magnitude limit 328. The wind turbine can be controlled based at least in part on the maximum reactive current magnitude limit 328.

As one example, the scheme 300 can be implemented by the turbine controller 202 to obtain the maximum reactive current magnitude limit 328. The turbine controller 202 can then provide the maximum reactive current magnitude limit 328 to the converter controller 262. The converter controller 262 can control the power conversion assembly 210 so that the magnitude of the reactive current component does not exceed the maximum reactive current magnitude limit 328 (e.g., by changing the timing the switching devices included in the power conversion assembly 210 to achieve the desired reactive current output).

Thus, the reactive current limit calculation scheme 300 can determine (e.g., continuously or periodically) an appropriate maximum reactive current magnitude limit 328 based on the maximum current magnitude limit 302 and one or more signals indicative of the magnitude of real current 304. Thus, as the magnitude of real current 304 fluctuates during operation of the wind turbine, the maximum reactive current magnitude limit 328 can be recalculated. The wind turbine control system can maintain the magnitude of the reactive current component at or below the maximum reactive current magnitude limit 328 so that the magnitude of the current is maintained at or below the maximum current magnitude limit.

However, the reactive current limit calculation scheme 300 illustrated in FIG. 3 can fail to account for imbalances among the three phases of power occurring at the grid to which the wind turbine is coupled (e.g., at grid bus 242). Such imbalances can include, for example, an imbalance in the voltage and/or current among the three phases of grid power. The scheme 300's failure to account for imbalances in the three phases of grid power can result in excessively large current in at least one phase (e.g., in various stages of the turbine power conversion assembly 210 and/or the generator 118). The turbine control system 200 may respond to the excessively large current by either tripping an overcurrent protector or performing an unnecessarily large amount of power-limiting. Tripping the overcurrent protector may cause the turbine to go offline, greatly damaging the efficiency of the turbine system.

The reactive current limit calculation scheme 300 can be implemented in hardware, firmware, software, or some combination thereof. In some embodiments, the reactive current limit calculation scheme 300 is implemented by the turbine controller 202. For example, the turbine controller 202 can include a processor that implements instructions retrieved from memory to process input values according to the reactive current limit calculation scheme 300. As another example, one or more of the components of reactive current limit calculation scheme 300 can be implemented or embodied by discrete circuitry (e.g., an arrangement of circuit components that performs a particular function). The circuitry may be in one or more chips (e.g., ASICs) or may be arranged on a circuit board.

Figure 4:
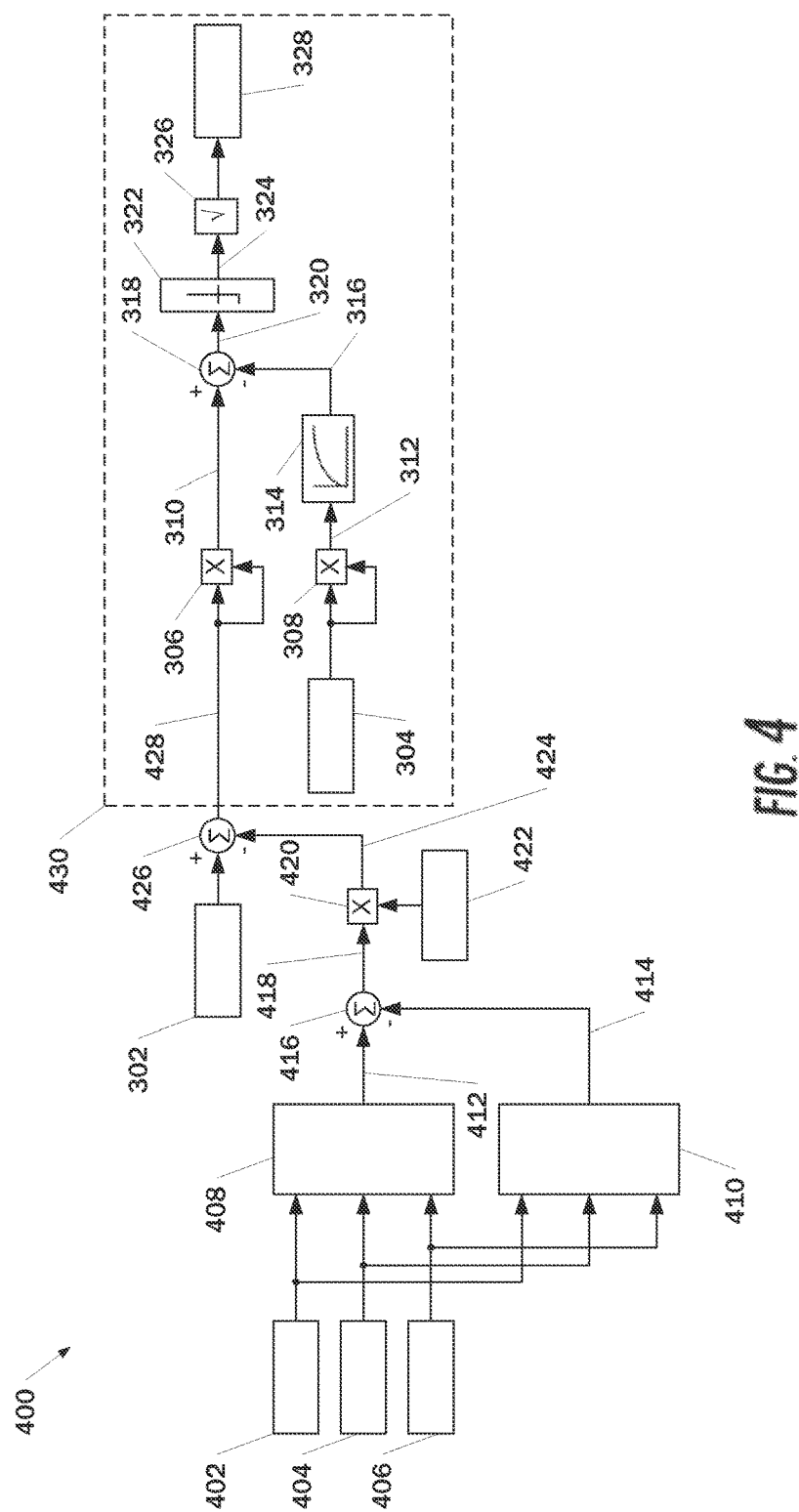
FIG. 4 depicts an example reactive current limit calculation scheme according to example embodiments of the present disclosure.

FIG. 4 depicts an example reactive current limit calculation scheme 400 according to example embodiments of the present disclosure. Reactive current limit calculation scheme can be implemented by one or more control devices (e.g., one or more of turbine controller 202, converter controller 262, etc.) to determine a maximum reactive current limit for a wind turbine. In particular, the scheme 400 evaluates an imbalance in the three phase grid power and adjusts the maximum current magnitude limit 302 accordingly, as will be discussed further below.

The scheme 400 receives as inputs one or more signals indicative of each of a first current magnitude 402 of a first phase of power, a second current magnitude 404 of a second phase of power, and a third current magnitude 406 of a third phase of power. In one embodiment, the signals respectively describe a root-mean-square (RMS) current value of the first phase of power, the second phase of power, and the third phase of power.

More particularly, in one embodiment, the one or more signals indicative of the magnitude of the first, second, and third currents can be indications of a magnitude of current (e.g., RMS current) occurring at the respective phases of the grid bus 242 (e.g., signals received from the first set of voltage and electric current sensors 252). In other embodiments, the one or more signals indicative of the magnitude of the real current 304 can be indications of real current occurring at the rotor bus 212, system bus 216, the stator bus 208, and/or the conversion circuit breaker bus 230.

The scheme 400 includes a selector 408 that identifies a largest current magnitude 412 out of the first current magnitude 402, the second current magnitude 404, and the third current magnitude 406.

The scheme 400 includes an average calculator 410 that averages the first current magnitude 402, the second current magnitude 404, and the third current magnitude 406 to obtain an average current magnitude 414. For example, the average can be a mean average.

The scheme 400 includes a summation node 416 that subtracts the average current magnitude 414 from the largest current magnitude 416 to obtain a maximum current adjustment factor 418.

In some embodiments, the scheme 400 includes a multiplication node 420 that multiplies the maximum current adjustment factor 418 by a scaling factor 422 to obtain a scaled maximum current adjustment factor 424. For example, the scaling factor 422 can be equal to one or other values.

The scheme 400 includes a summation node 426 that subtracts the scaled maximum current adjustment factor 424 from the maximum current magnitude limit 302 of the wind turbine to obtain an adjusted maximum current magnitude limit 428. Thus, the adjusted maximum current magnitude limit 428 corresponds to the maximum current magnitude limit 302 adjusted by the scaled maximum current adjustment factor 424.

Scaling factor values greater than one will result in a relatively larger scaled adjustment factor 424 being subtracted from the maximum current magnitude value 302, thereby resulting in more conservative wind turbine performance. Likewise, scaling factor values less than one will result in a relatively smaller scaled adjustment factor 424 being subtracted from the maximum current magnitude value 302, thereby resulting in less conservative wind turbine performance. Thus, the scaling factor 422 can be adjusted to implement or account for various different operational risk profiles or tolerances. In other embodiments, the scheme 400 does not include the multiplication node 420 or the scaling factor 422.

Thus, adjusting the maximum current magnitude limit 302 by the scaled maximum current adjustment factor 424 results in an adjusted maximum current magnitude limit 428 which accounts for imbalances among the three phases of power occurring at the grid to which the wind turbine is coupled (e.g., at grid bus 242). In particular, a scaled difference between the maximum current and the average current of the three phases of power is subtracted from the maximum current magnitude limit 302 so that further downstream use of the adjusted maximum current magnitude limit 428 counter-acts or otherwise accounts for any imbalances among the three phases of power occurring at the grid.

As one example use of the adjusted maximum current magnitude limit 428, the scheme 400 further includes a reactive current calculator 430. The reactive current calculator 430 can calculate the maximum reactive current magnitude limit 328 based at least in part on the adjusted maximum current magnitude limit 428.

In some embodiments, such as the embodiment illustrated in FIG. 4, the reactive current calculator 430 is identical to the reactive current limit calculation scheme 300, except that the reactive current calculator 430 uses the adjusted maximum current magnitude limit 428 in place of the maximum current magnitude limit 302.

Thus, through use of the adjusted maximum current magnitude limit 428 as an input to the reactive current calculator 430, the scheme 400 can produce a maximum reactive current magnitude limit 328 that accounts for any imbalances among the three phases of power occurring at the grid. As such, the scheme 400 accounts for and prevents excessively large current (e.g., in at least one phase of the turbine converter and/or generator) caused by such imbalances. Therefore, the scheme 400 prevents the inefficiencies associated with tripping an overcurrent protector or performing an unnecessarily large amount of power-limiting.

An operating condition of the wind turbine can be controlled based at least in part on the maximum reactive current magnitude limit 328. For instance, one or more of a power output of the generator, torque of the generator, and/or rotational speed of the rotor can be adjusted based at least in part on the maximum reactive current magnitude limit 328 provided by scheme 400. As another example, the wind turbine control system can maintain the reactive current setpoint of the power conversion assembly 210 at or below the maximum reactive current magnitude limit 328 so that the current of the wind turbine is maintained at or below the maximum current limit despite potential imbalances of the three phase power at the grid.

The reactive current limit calculation scheme 400 can be implemented in hardware, firmware, software, or some combination thereof. In some embodiments, the reactive current limit calculation scheme 400 is implemented by the turbine controller 202. For example, the turbine controller 202 can include a processor that implements instructions retrieved from memory to process input values according to the reactive current limit calculation scheme 400. As another example, one or more of the components of reactive current limit calculation scheme 400 can be implemented or embodied by discrete circuitry (e.g., an arrangement of circuit components that performs a particular function). The circuitry may be in one or more chips (e.g., ASICs) or may be arranged on a circuit board.

Figure 5:
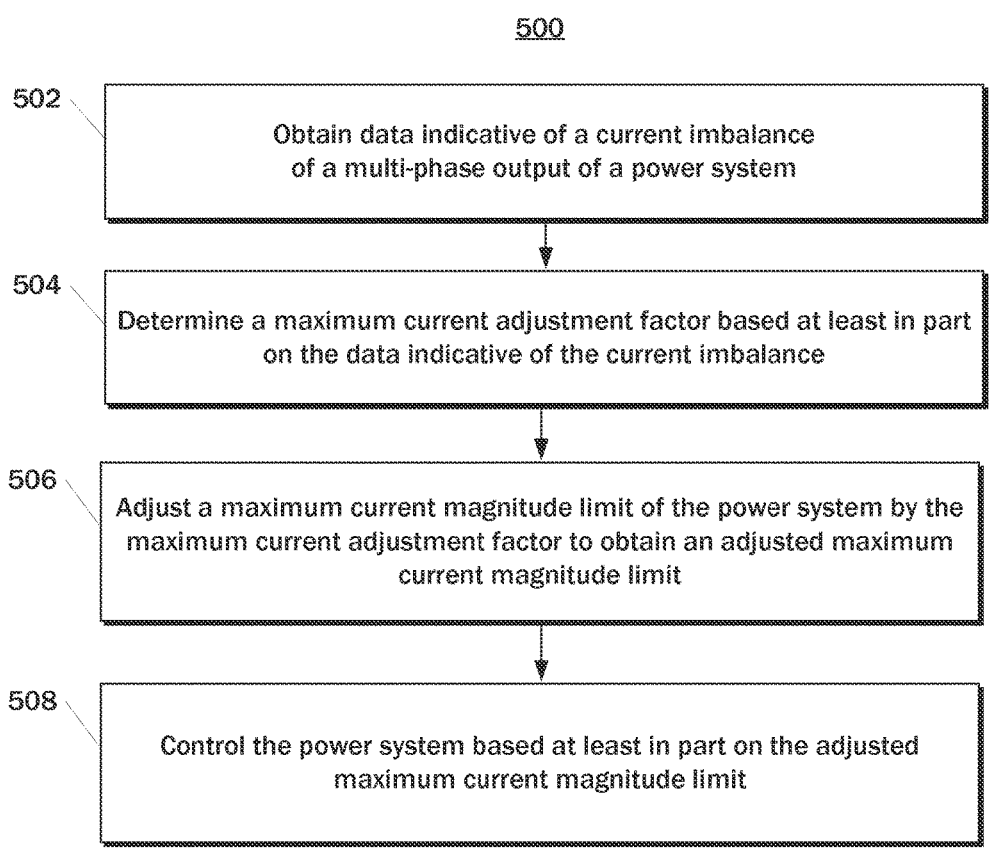
FIG. 5 depicts a flow diagram of an example control method according to example embodiments of the present disclosure.

FIG. 5 depicts a flow diagram of an example control method (500) according to example embodiments of the present disclosure. The method (500) can be implemented by one or more control devices, such as the converter controller 262, turbine controller 202 or other suitable controller(s) (e.g., farm controller, etc.). In addition, FIG. 5 depicts steps performed in a particular order for purposes of illustration and discussion, those of ordinary skill in the art, using the disclosures provided herein, will understand that various steps of any of the methods discussed herein can be adapted, modified, rearranged, omitted, or expanded in various ways without deviating from the scope of the present disclosure.

At (502), data is obtained that is indicative of a current imbalance of a multi-phase output of a power system, such as, for example, a wind turbine. For example, the data can be indicative of a negative sequence component of the multi-phase output of the power system. In some embodiments, the data indicative of the current imbalance can be data that describes a magnitude of each phase of a three phase power output (e.g., three phases of grid power). In some embodiments, the data can describe RMS current magnitude values for each of the three phases.

At (504), a maximum current adjustment factor is determined based at least in part on the data indicative of the current imbalance. In some embodiments, the adjustment factor can correspond to the amount of imbalance. As an example, the adjustment factor can correspond to a scaled difference between a maximum current magnitude and an average current magnitude of the multi-phase output.

At (506), a maximum current magnitude limit of the power system is adjusted by the maximum current adjustment factor to obtain an adjusted maximum current magnitude limit. For example, the maximum current adjustment factor can be subtracted from the maximum current magnitude limit.

At (508), the power system is controlled based at least in part on the adjusted maximum current magnitude limit. For example, the power system can be controlled such that the current does not exceed the adjusted maximum current magnitude limit.

Figure 6:
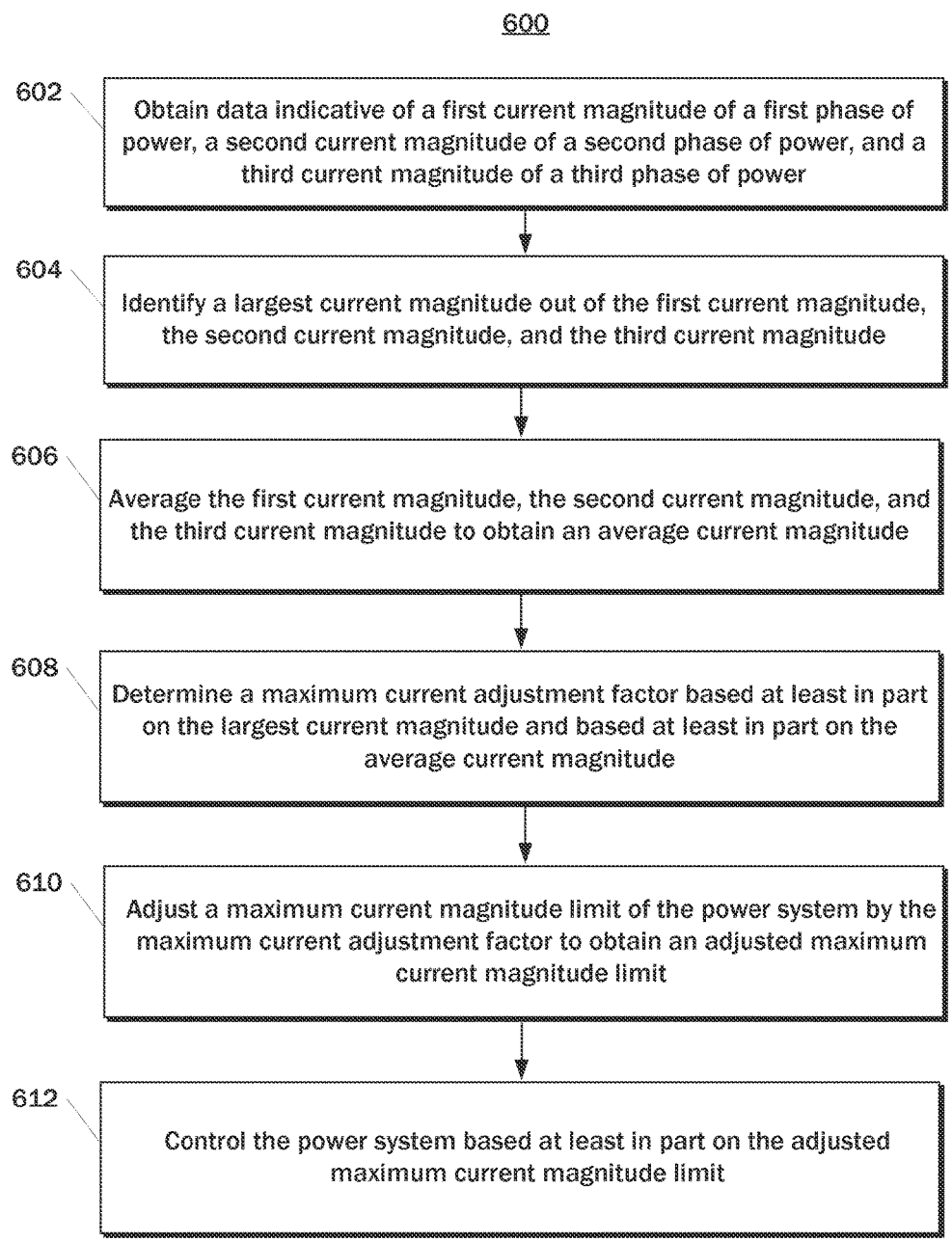
FIG. 6 depicts a flow diagram of an example control method according to example embodiments of the present disclosure.

FIG. 6 depicts a flow diagram of an example control method (600) according to example embodiments of the present disclosure. The method (600) can be implemented by one or more control devices, such as the converter controller 262, turbine controller 202 or other suitable controller(s) (e.g., farm controller, etc.). In addition, FIG. 6 depicts steps performed in a particular order for purposes of illustration and discussion, those of ordinary skill in the art, using the disclosures provided herein, will understand that various steps of any of the methods discussed herein can be adapted, modified, rearranged, omitted, or expanded in various ways without deviating from the scope of the present disclosure.

At (602), data is obtained that is indicative of a first current magnitude of a first phase of power, a second current magnitude of a second phase of power, and a third current magnitude of a third phase of power. For example, the data can describe RMS current values of the three phases of grid power.

At (604), the method can include identifying, by the one or more control devices, a largest current magnitude out of the first current magnitude, the second current magnitude, and the third current magnitude. As an example, the selector 408 can identify the largest current magnitude 412 out of the first current magnitude 402, the second current magnitude 404, and the third current magnitude 406.

At (606), the first current magnitude, the second current magnitude, and the third current magnitude are averaged to obtain an average current magnitude. As an example, the average calculator 410 can average the first current magnitude 402, the second current magnitude 404, and the third current magnitude 406 to obtain an average current magnitude 414. For example, the average can be a mean average.

At (608), a maximum current adjustment factor is determined based at least in part on the largest current magnitude and based at least in part on the average current magnitude. For example, in some embodiments, determining the maximum current adjustment factor based at least in part on the largest current magnitude and based at least in part on the average current magnitude at (608) includes subtracting the average current magnitude from the largest current magnitude to obtain the maximum current adjustment factor. As an example, the summation node 416 can subtract the average current magnitude 414 from the largest current magnitude 416 to obtain a maximum current adjustment factor 418.

Further, in some embodiments, at (608) the maximum current adjustment factor can be scaled by a scaling factor to obtain a scaled maximum current adjustment factor. For example, the maximum current adjustment factor can be multiplied by the scaling factor. The scaling factor can equal one or can equal other values. The scaled maximum current adjustment factor can be used in addition to or in place of the non-scaled maximum current adjustment factor. As an example, the multiplication node 420 can multiply the maximum current adjustment factor 418 by the scaling factor 422.

At (610), a maximum current magnitude limit of the wind turbine is adjusted by the maximum current adjustment factor to obtain an adjusted maximum current magnitude limit. For example, in some embodiment, adjusting the maximum current magnitude limit at (610) includes subtracting the maximum current adjustment factor from the maximum current magnitude limit to obtain the adjusted maximum current magnitude limit. As an example, the summation node 426 can subtract the scaled maximum current adjustment factor 424 from the maximum current magnitude limit 302 to obtain the adjusted maximum current magnitude limit 428.

At (612), the power system is controlled based at least in part on the adjusted maximum current magnitude limit. For example, the adjusted maximum current magnitude limit can be used in place of the original maximum current magnitude limit for any control techniques or processes.

In some embodiments, the adjusted maximum current magnitude limit is an adjusted maximum current magnitude limit. In some of such embodiments, controlling the power system at (612) includes determining a maximum reactive current limit based at least in part on the adjusted maximum current magnitude limit and controlling the power system based at least in part on the maximum reactive current limit.

In some embodiments, determining the maximum reactive current limit based at least in part on the adjusted maximum current magnitude limit includes squaring the adjusted maximum current magnitude limit to obtain a squared maximum current magnitude limit; squaring a real current magnitude to obtain a squared real current magnitude; determining a squared maximum reactive current limit based at least in part on the squared maximum current magnitude limit and based at least in part on the squared real current magnitude; and determining a square root of the squared maximum reactive current limit to obtain the maximum reactive current limit.

In some embodiments, determining the squared maximum reactive current limit based at least in part on the squared maximum current magnitude limit and based at least in part on the squared real current magnitude includes passing the squared real current magnitude through a filter to obtain a filtered squared real current magnitude; subtracting the filtered squared real current magnitude from the squared maximum current magnitude limit to obtain a raw squared maximum reactive current limit; and clamping the raw squared real current magnitude to obtain the squared maximum reactive current limit.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a power system having a multiphase output, said power system being electrically connected to a power grid having a plurality of phases of power, the method comprising:
   obtaining, by one or more control devices, data indicative of a first current magnitude of a first phase of a multiphase output, a second current magnitude of a second phase of the multiphase output, and a third current magnitude of a third phase of the multiphase output;
   identifying, by the one or more control devices, a largest current magnitude out of the first current magnitude, the second current magnitude, and the third current magnitude;
   averaging, by the one or more control devices, the first current magnitude, the second current magnitude, and the third current magnitude to obtain an average current magnitude;
   determining, by the one or more control devices, a difference between the average current magnitude and the largest current magnitude to obtain a maximum current adjustment factor;
   adjusting, by the one or more control devices, a maximum current magnitude limit of the power system by the maximum current adjustment factor to obtain an adjusted maximum current magnitude limit; and
   controlling, by the one or more control devices, the power system based at least in part on the adjusted maximum current magnitude limit such that the multiphase output of the power system counter-acts imbalance among one or more of the plurality of phases of the power grid.

2. The method of claim 1, wherein controlling, by the one or more control devices, the power system based at least in part on the adjusted maximum current magnitude limit comprises:
   determining, by the one or more control devices, an adjusted maximum reactive current limit based at least in part on the adjusted maximum current magnitude limit; and
   controlling, by the one or more control devices, the power system based at least in part on the adjusted maximum reactive limit.

3. The method of claim 2, wherein determining, by the one or more control devices, the maximum reactive current limit based at least in part on the adjusted maximum current magnitude limit comprises:
   squaring, by the one or more control devices, the adjusted maximum current magnitude limit to obtain a squared maximum current magnitude limit;
   squaring, by the one or more control devices, a real current magnitude to obtain a squared real current magnitude;
   determining, by the one or more control devices, a squared maximum reactive current limit based at least in part on the squared maximum current magnitude limit and based at least in part on the squared real current magnitude; and
   determining, by the one or more control devices, a square root of the squared maximum reactive current limit to obtain the maximum reactive current limit.

4. The method of claim 1, wherein adjusting, by the one or more control devices, the maximum current magnitude limit comprises subtracting, by the one or more control devices, the maximum current adjustment factor from the maximum current magnitude limit to obtain the adjusted maximum current magnitude limit.

5. The method of claim 1, further comprising:
   scaling, by the one or more control devices, the maximum current adjustment factor by a scaling factor to obtain a scaled maximum current adjustment factor;
   wherein adjusting, by the one or more control devices, the maximum current magnitude limit comprises adjusting, by the one or more control devices, the maximum current magnitude limit of the power system by the scaled maximum current adjustment factor to obtain the adjusted maximum current magnitude limit.

6. The method of claim 1, wherein a magnitude of the adjustment factor is determined based on a magnitude of the current imbalance.

7. A control system for a power system having a multiphase output, said power system being electrically connected to a power grid having a plurality of phases of power, the control system comprising:
   a selector that identifies a largest current magnitude out of a first current magnitude of a first phase of power, a second current magnitude of a second phase of power, and a third current magnitude of a third phase of power;
   an average calculator that averages the first current magnitude, the second current magnitude, and the third current magnitude to obtain an average current magnitude;
   a first summation node that subtracts the average current magnitude from the largest current magnitude to obtain a maximum current adjustment factor;
   a second summation node that subtracts the maximum current adjustment factor from a maximum current magnitude limit of the power system to obtain an adjusted maximum current magnitude limit;
   one or more control devices that control the power system based at least in part on the adjusted maximum current magnitude limit such that the multiphase output of the power system counter-acts imbalance among one or more of the plurality of phases of the power grid.

8. The control system of claim 7, wherein:
   the second summation node subtracts the maximum current adjustment factor from a maximum current magnitude limit of the power system to obtain an adjusted maximum current magnitude limit; and
   the one or more control devices control the power system based at least in part on the adjusted maximum current magnitude limit.

9. The control system of claim 8, further comprising:
   a first multiplication node that multiplies the maximum current adjustment factor by a scaling factor to obtain a scaled maximum current adjustment factor;
   wherein the second summation node subtracts the scaled maximum current adjustment factor from the maximum current magnitude limit of the power system to obtain the adjusted maximum current magnitude limit.

10. The control system of claim 8, further comprising:
    a reactive current limit calculator that determines a maximum reactive current limit based at least in part on the adjusted maximum current magnitude limit;

wherein the one or more control devices control the power system based at least in part on the maximum reactive current limit.

11. A wind turbine system, said wind turbine system being electrically connected to a power grid having a plurality of phases of power, comprising:
   a generator;
   a rotor configured to rotatably drive the generator;
   a turbine controller that:
      obtains data indicative of a first current magnitude of a first phase of power, a second current magnitude of a second phase of power, and a third current magnitude of a third phase of power;
      identifies a largest current magnitude out of the first current magnitude, the second current magnitude, and the third current magnitude;
      averages the first current magnitude, the second current magnitude, and the third current magnitude to obtain an average current magnitude;
      subtracts the average current magnitude from the largest current magnitude to obtain a maximum current adjustment factor;
      adjusts a maximum current magnitude limit of the wind turbine by the maximum current adjustment factor to obtain an adjusted maximum current magnitude limit: and
      control the wind turbine based at least in part on the adjusted maximum current magnitude limit such that at least output of the wind turbine counter-acts imbalance among one or more of the plurality of phases of the power grid.

12. The wind turbine system of claim 11, wherein the turbine controller:
   subtracts the maximum current adjustment factor from the maximum current magnitude limit to obtain the adjusted maximum current magnitude limit.

13. The wind turbine system of claim 11, wherein the turbine controller:
   scales the maximum current adjustment factor by a scaling factor to obtain a scaled maximum current adjustment factor;
   adjusts the maximum current magnitude limit of the wind turbine by the scaled maximum current adjustment factor to obtain the adjusted maximum current magnitude limit.

14. The wind turbine system of claim 11, wherein the turbine controller:
   determines a maximum reactive current limit based at least in part on the adjusted maximum current magnitude limit; and
   controls the wind turbine based at least in part on the maximum reactive current limit.

* * * * *